(12) United States Patent
Yaku et al.

(10) Patent No.: US 7,485,845 B2
(45) Date of Patent: Feb. 3, 2009

(54) PHOTOELECTRIC ENCODER CAPABLE OF EFFECTIVELY REMOVING HARMONIC COMPONENTS

(75) Inventors: Toru Yaku, Kawasaki (JP); Tetsuro Kiriyama, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/566,433

(22) Filed: Dec. 4, 2006

(65) Prior Publication Data

US 2007/0125939 A1    Jun. 7, 2007

(30) Foreign Application Priority Data

Dec. 6, 2005   (JP)   .............................. 2005-352397

(51) Int. Cl.
   *G01D 5/34* (2006.01)
(52) U.S. Cl. .................. 250/231.13; 250/231.16; 250/237 G; 356/616
(58) Field of Classification Search ........... 250/231.13, 250/231.16, 237 G; 356/616, 618, 619
   See application file for complete search history.

(56) References Cited

U.S. PATENT DOCUMENTS

| | | | |
|---|---|---|---|
| 4,602,436 A | | 7/1986 | Ernst |
| 5,068,530 A | * | 11/1991 | Ieki et al. ................. 250/237 G |
| 5,576,537 A | * | 11/1996 | Holzapfel et al. ........ 250/237 G |
| 5,801,378 A | * | 9/1998 | Hane et al. ............... 250/237 G |
| 5,814,812 A | | 9/1998 | Holzapfel |
| 5,994,692 A | * | 11/1999 | Holzapfel ................ 250/237 G |
| 6,094,307 A | * | 7/2000 | Ieki .............................. 359/569 |

* cited by examiner

*Primary Examiner*—Stephen Yam
(74) *Attorney, Agent, or Firm*—Rankin, Hill & Clark LLP

(57) ABSTRACT

A three-grating type photoelectric encoder includes a second grating formed on a scale and first and third gratings disposed on a side of a detector. A part of at least the first grating is shifted in a direction of a measurement axis by $P/(2n)$ (wherein P is a grating pitch, n is the order of a harmonic component to be removed) in order to remove a harmonic component of the nth order. This encoder can be improved with high accuracy by removing harmonic components without increasing manufacturing costs.

12 Claims, 7 Drawing Sheets

(A) Light transmission type (B) Reflective type
(Using half mirror)

(C) Reflective type
(Oblique incident)

← Direction of measurement axis →

← Direction of measurement axis →

PHOTOELECTRIC ENCODER CAPABLE OF EFFECTIVELY REMOVING HARMONIC COMPONENTS

CROSS-REFERENCE TO RELATED APPLICATION

The disclosure of Japanese Patent Application No. 2005-352397 filed on Dec. 6, 2005 including specifications, drawings and claims is incorporated herein by reference in its entirety.

BACKGROUND OF THE INVENTION

1. Field of the Invention

The present invention relates to a three-grating type photoelectric encoder which is provided with a second grating formed on a scale and first and third gratings disposed on the side of a detector. In particular, the present invention relates to a photoelectric encoder which can effectively remove harmonic components.

2. Description of the Related Art

In a so-called three-grating principle used in a linear encoder, as described in, for example, Patent Document 1 (Japanese Patent Laid-Open Publication No. Sho 63-33604, see FIGS. 1 to 3 thereof), three optical gratings serve as a spatial filter. For a transmission type shown in FIG. 1(A), the three optical gratings are a second grating 20 serving as a main scale and first and third gratings 22 and 24 serving as an index scale. For reflection types shown in FIGS. 1(B) and 1(C), light passes through a common first grating 22 (also serving as a third grating) twice. Therefore, it is possible to detect an approximately sinusoidal signal and carry out interpolation with high precision. In FIGS. 1(A) to 1(C), reference numeral 26 represents a light source, and reference numeral 28 represents an optical system composed of, for example, a collimator lens. Reference numeral 30 represents a light receiving element, and reference numeral 32 represents a half mirror employed in one reflection type. Reference numeral 34 represents a mirror employed in another reflection type, and reference numeral 36 represents a condensing lens employed in the reflection type.

When the three-grating principle is adopted in the reflective encoder, as shown in FIGS. 1(B) and 1(C), a scale grating serves as a second grating 20. In the optical grating on a scale, however, line width varies in accordance with the position of the scale. Therefore, there is a problem that a harmonic component is superimposed on an output signal at that portion.

Accordingly, Patent Document 2 (Japanese Patent Laid-Open Publication No. Hei 9-196706, see FIG. 5) and Patent Document 3 (Japanese Patent Laid-Open Publication No. 2004-264295, see FIG. 4), as shown in FIG. 2, have proposed methods in which third gratings 24 in front of a light receiving element 30 and the light receiving element compose a light receiving element array 31 to stabilize an output signal by averaging effect of the light receiving array.

Furthermore, in the structure of FIG. 2, methods for providing phase difference (Patent Document 4: Japanese Patent Laid-Open Publication No. Hei 10-122909, see FIG. 2) or line width modulation (Patent Document 5: Japanese Patent Laid-Open Publication No. Hei 8-145724, see FIG. 2) have been proposed to remove a harmonic component.

Patent Document 6 (Japanese Patent Laid-Open Publication No. Hei 9-113213, see FIG. 3) has proposed a method in which the grating patterns of a first grating and a third grating have a phase difference in a detection principle using the three-grating principle.

However, the methods in which the light receiving array has the phase difference or the line width modulation as described in Patent Documents 4 and 5 need to vary the pattern of the light receiving element, thereby increasing manufacturing costs.

In the method in which the grating patterns of the first grating and the third grating have a phase difference as described in Patent Document 6, however, if a light receiving array is used instead of the third grating, only harmonic components in the order of even numbers can be removed because light passes through the same grating twice. Therefore, it is impossible to remove harmonic components in the order of odd numbers, in particular, the harmonic component of the 3rd order which is larger than the harmonic of the 2nd order and becomes the biggest problem. Hence, there is a problem that the light receiving array cannot be used instead of the third grating.

The above problems reside not only in the reflection type encoder but also in the transmission type encoder.

SUMMARY OF THE INVENTION

The present invention has been devised in view of the abovementioned problems, and an object of the present invention is to improve a photoelectric encoder with high accuracy by devising a first grating pattern to remove harmonic components without increasing manufacturing costs.

To solve the foregoing problems, according to the present invention, a three-grating type photoelectric encoder includes a second grating formed on a scale and first and third gratings disposed on a side of a detector. A part of at least the first grating is shifted in a direction of a measurement axis by $P/(2n)$ (wherein P is a grating pitch, n is the order of a harmonic component to be removed) in order to remove a harmonic component of the nth order.

According to another aspect of the invention, the first grating is divided in a direction perpendicular to the measurement axis or in the direction of the measurement axis, and shifted.

According to still another aspect of the invention, a plurality of portions of the first grating is shifted by respective different shift amounts.

According to yet another aspect of the invention, the shift amount is continuously varied to deform a grating pattern in the shape of a sine wave.

According to another aspect of the invention, a part of the third grating is also shifted in the direction of the measurement axis.

According to the present invention, since a part of the first grating is shifted in the direction of the measurement axis by $P/(2n)$, interference fringes are composed on the surface of a light receiving array. Thus, as in the case of a harmonic component of the third order (n=3) shown in FIG. 3, it is possible to remove a harmonic component of the nth order.

When the first grating is divided in the direction perpendicular to the measurement axis or in the direction of the measurement axis and shifted, the composition of interference fringes is averaged on the surface of the light receiving array.

Shifting a plurality of portions of the first grating by the respective different shift amounts makes it possible to remove harmonic components of a plurality of orders.

Continuously varying the shift amount to deform the grating pattern in the shape of the sine wave makes it possible to average the composition of interference fringes on the surface of the light receiving array.

Furthermore, also shifting a part of the third grating in the direction of the measurement axis can further remove harmonic components.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Exemplary embodiments of the present invention will be hereinafter described in detail with reference to the drawings.

Figure 4A:
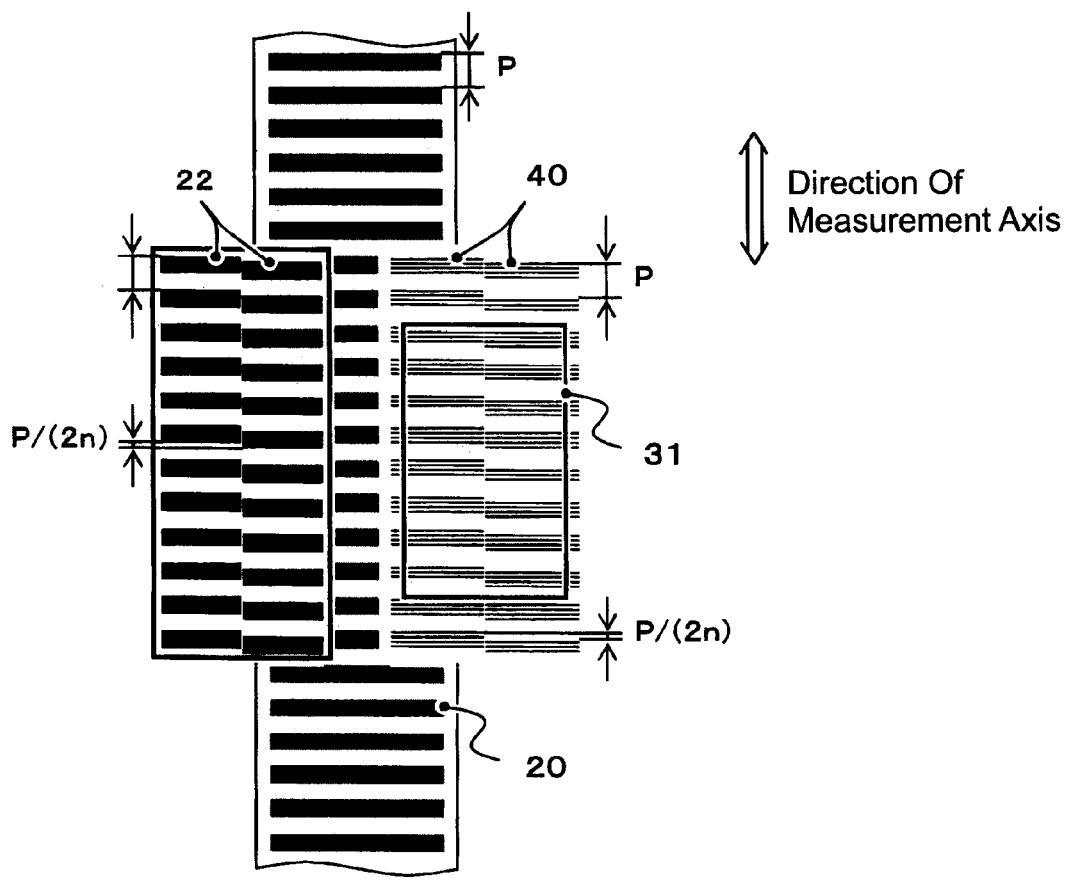
FIGS. 4a and 4b are a plan view and an elevation view showing the basic structure of a first exemplary embodiment of the present invention.
Figure 4B:
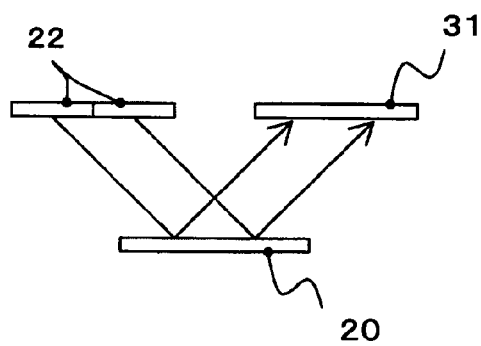

In a first exemplary embodiment of the present invention applied to the reflection type encoder, as shown in FIG. 4, the pattern of a first grating 22 formed on a glass substrate with low manufacturing costs, on which a light receiving array 31 is to be mounted, is divided in two in a direction perpendicular to a measurement axis. Then, one of the patterns is shifted in the direction of the measurement axis with respect to the other. When n represents the order of a harmonic component to be removed, the corresponding shift amount is represented by a grating pitch P/(2×n). When a harmonic component of the 3rd order is removed, a shift amount is P/6.

In the first exemplary embodiment, light emitted from a light source transmits through the first grating 22, reflected by the second grating 20 and generates interference fringes 40 on a light receiving surface of the light receiving array 31.

Thus, the interference fringes of harmonic components of the nth order, which are generated through the first grating 22 and a second grating 20, are composed, compensated, and removed on a light receiving surface of the light receiving array 31.

Figure 1:
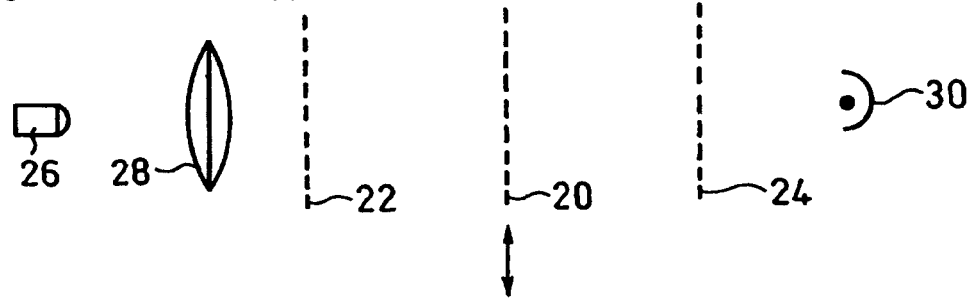
FIG. 1 is a drawing showing the basic structures of an encoder adopting a three-grating principle disclosed in Patent Document 1.
Figure 1:
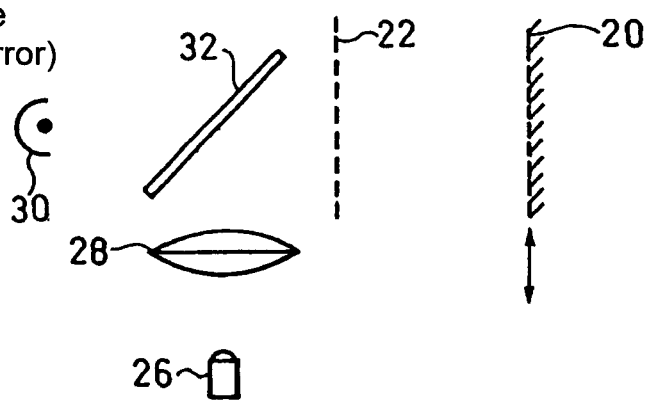
Figure 1:
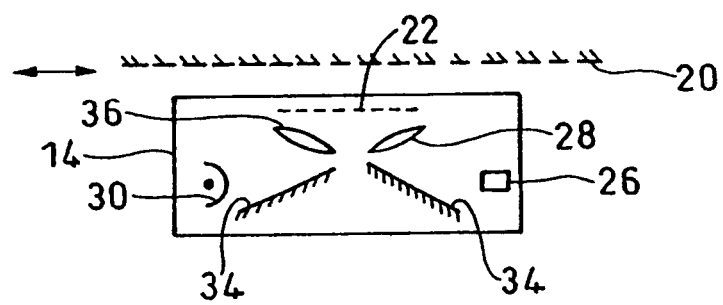
Figure 2:
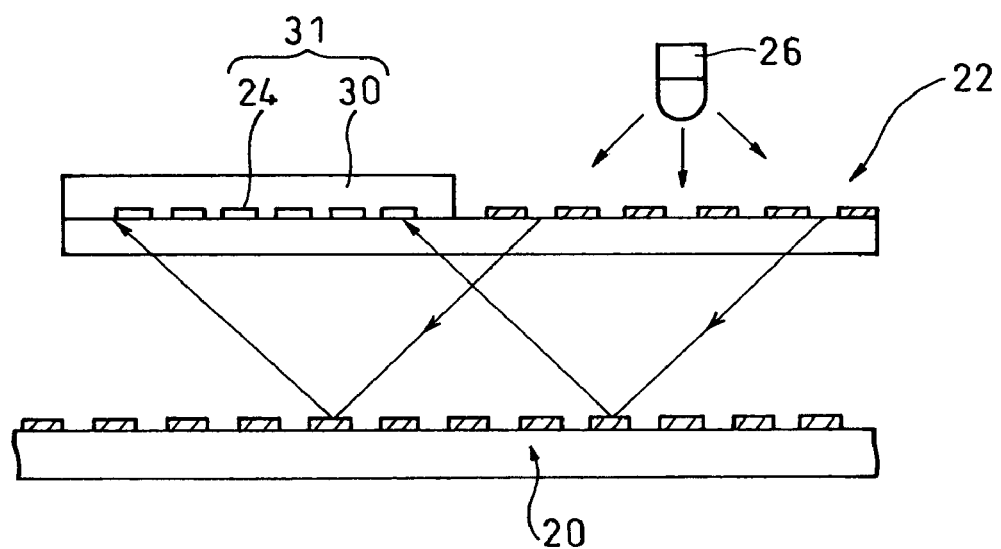
FIG. 2 is a sectional view showing an example of a reflective encoder adopting the three-grating principle having a light receiving array disclosed in Patent Documents 2 and 3.
Figure 3:
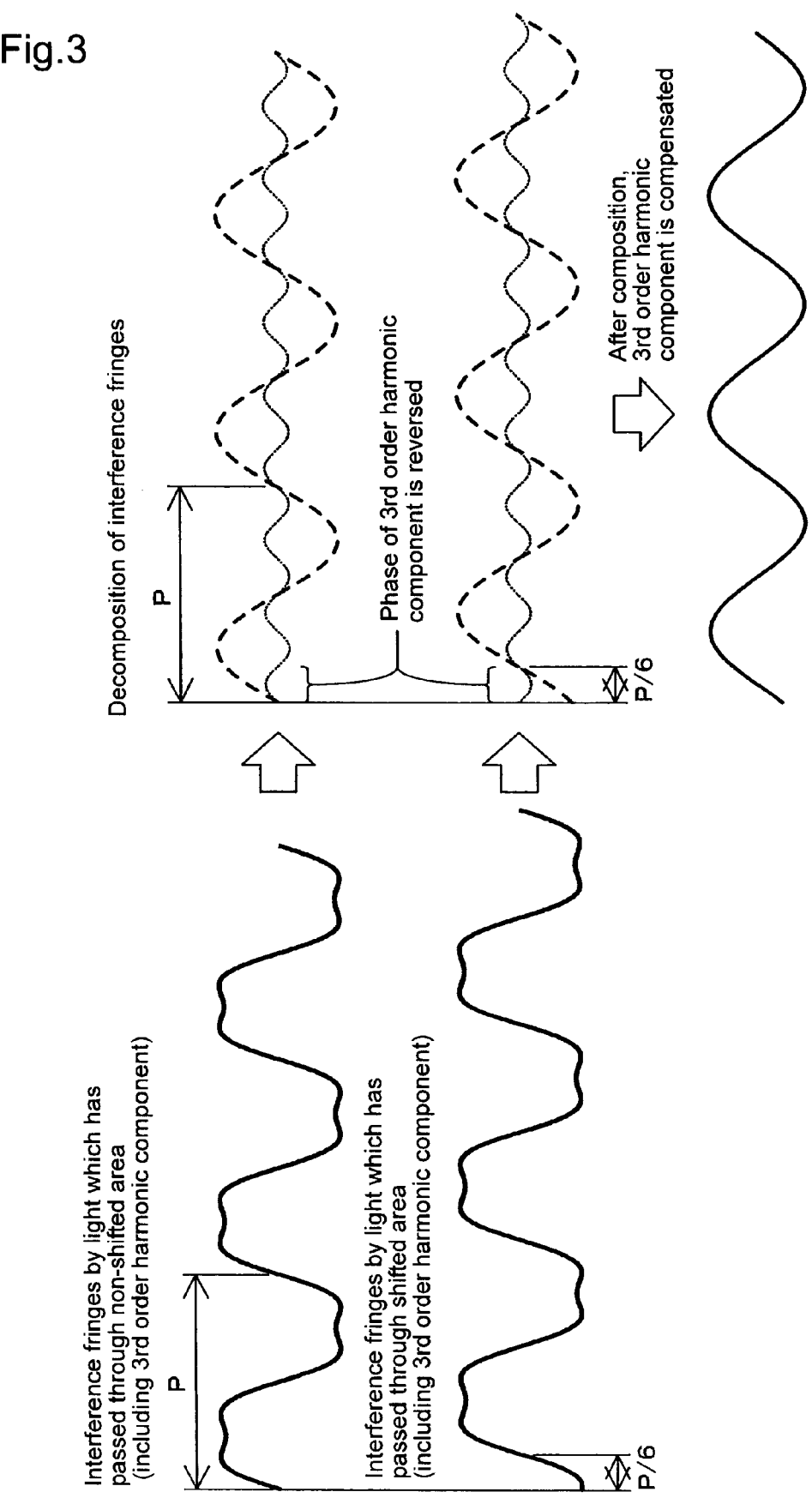
FIG. 3 is a drawing showing the effect of the present invention.

Accordingly, the pattern of a third grating 24 (see FIG. 2) on a light receiving array 31 does not need to especially take measures against harmonic components. The third grating 24 may take the measures against harmonic components as with the first grating 22 in order to, for example, remove a harmonic component of the different order from the first grating.

Figure 5:
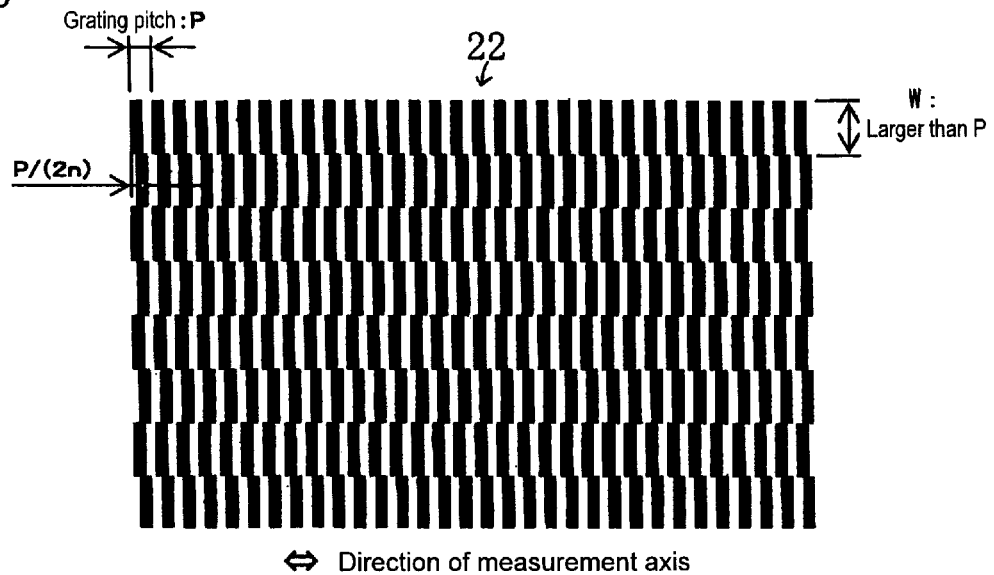
FIG. 5 is a plan view showing a first grating according to a second exemplary embodiment of the present invention.

A second exemplary embodiment of the present invention will now be described with reference to FIG. 5.

In this exemplary embodiment, a first grating 22 is divided into many portions in a direction perpendicular to a measurement axis (vertical direction in the drawing) to alternately arrange shift areas and non-shift areas in the direction perpendicular to the measurement axis. It should be appreciated that the width W of the shift area is equal to or larger than a grating pitch P.

Since the shift areas and non-shift areas are alternately arranged in the direction perpendicular to the measurement axis, as described above, the composition of interference fringes on the light receiving array is averaged.

Figure 6:
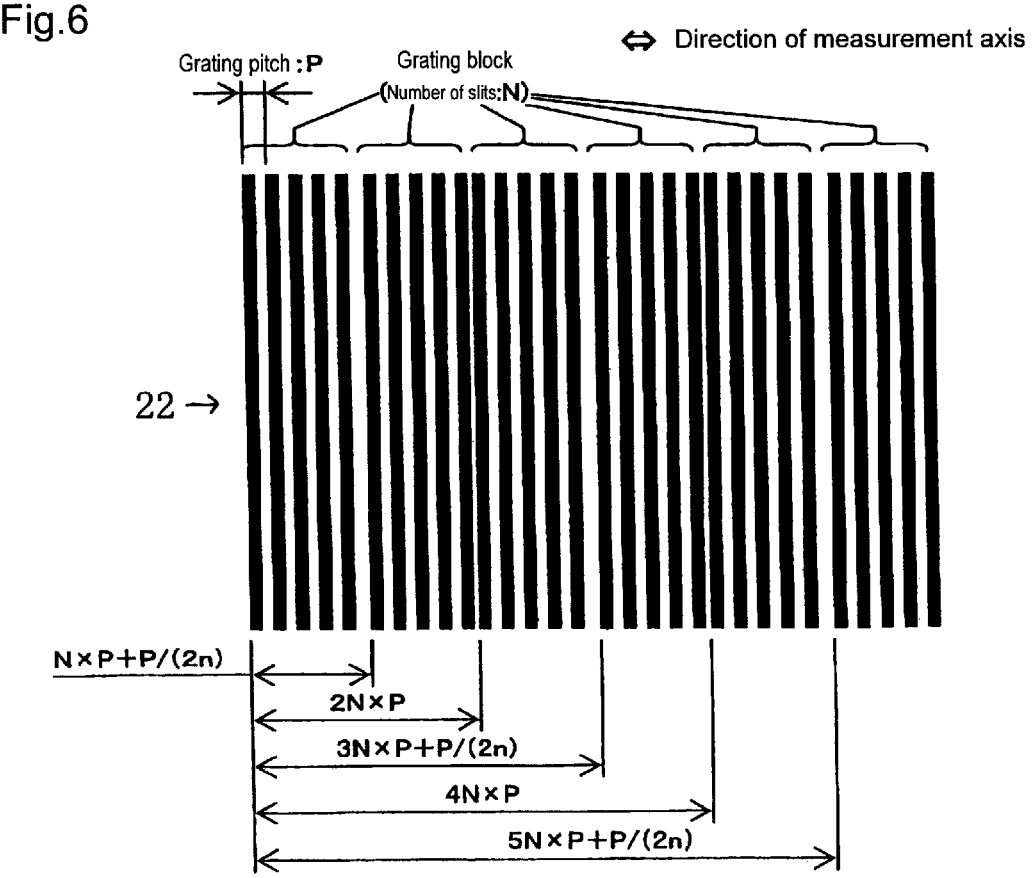
FIG. 6 is a plan view showing a first grating according to a third exemplary embodiment of the present invention.

A third exemplary embodiment of the present invention will now be described in detail with reference to FIG. 6.

In this exemplary embodiment, shift areas of a first grating 22 are dividedly arranged every, for example, N slits in the direction of a measurement axis (horizontal direction in the drawing).

Since the shift areas and non-shift areas are alternately arranged in the direction of the measurement axis, as described above, the composition of interference fringes on the light receiving array is averaged.

Figure 7:
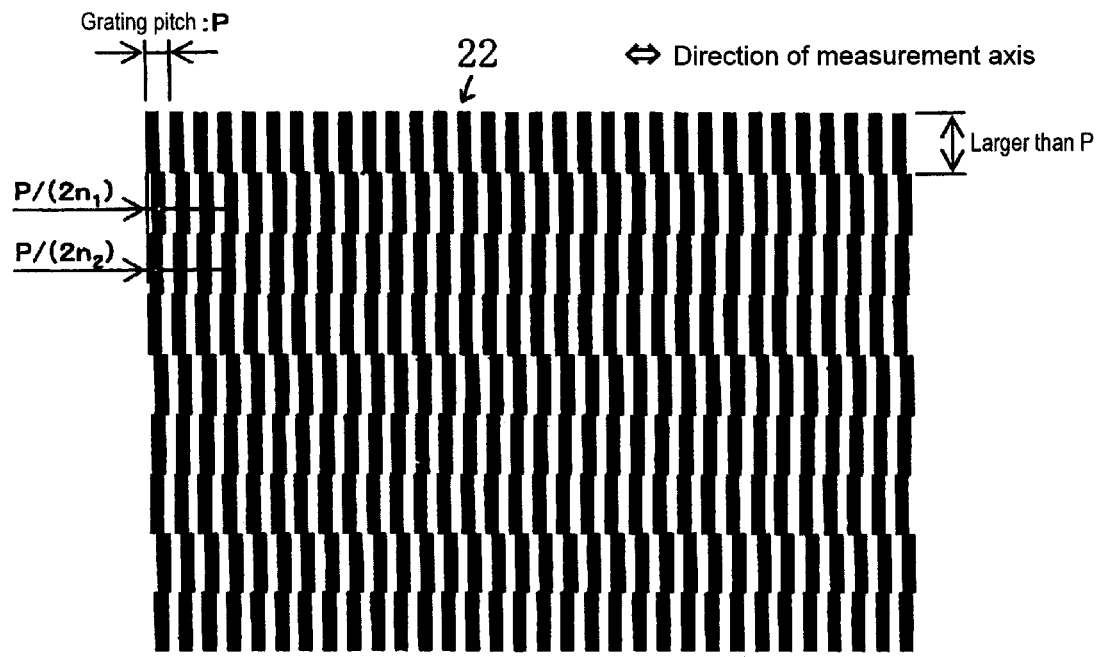
FIG. 7 is a plan view showing a first grating according to a fourth exemplary embodiment of the present invention.

A fourth exemplary embodiment of the present invention will now be described in detail with reference to FIG. 7.

In this exemplary embodiment, a first grating 22 is divided into three or more (nine in the drawing) in a direction perpendicular to a measurement axis, and shift amounts are individually set in respective areas.

Taking a case where, for example, harmonic components of the $n_1$th and $n_2$th orders are supposed to be removed. In this case, at least three areas are provided. One of the areas is set as a reference area, and the shift amounts of optical gratings of the other areas are set at $P/(2n_1)$ and $P/(2n_2)$, respectively.

Thus, it is possible to remove a plurality of harmonic components of the $n_1$th and $n_2$th orders.

Figure 8:
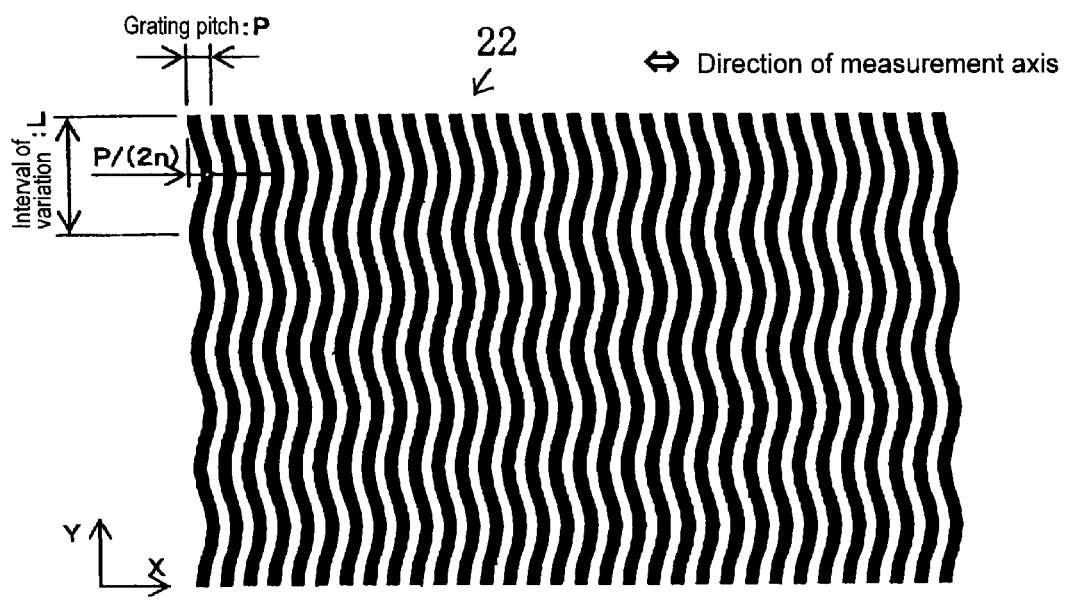
FIG. 8 is a plan view showing a first grating according to a fifth exemplary embodiment of the present invention.

A fifth exemplary embodiment of the present invention will now be described in detail with reference to FIG. 8.

In this exemplary embodiment, the pattern of a first grating 22 is continuously deformed in the shape of a sine wave in a direction perpendicular to a measurement axis at a cycle L so that a shift amount is $P/(2n) \times (1+\sin 2\pi(y/L))/2$.

The shift amount continuously varies in this exemplary embodiment. Therefore, in setting, for example, n=2, harmonic components of the order of n=3 or more are also removed at the same time.

Figure 9:
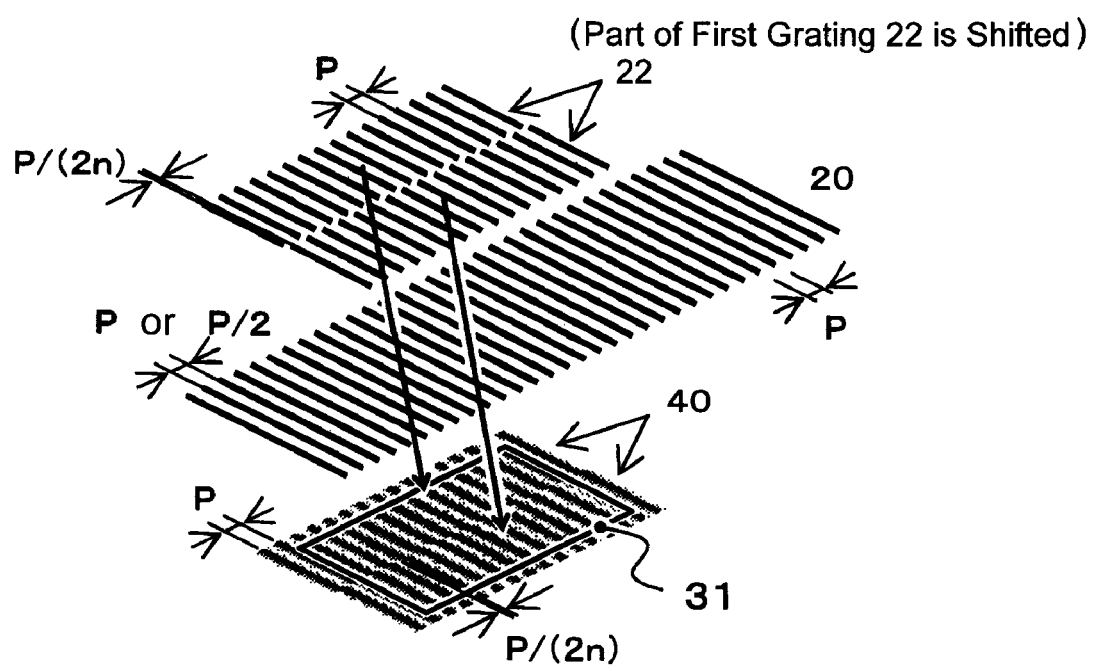
FIG. 9 is a perspective view showing the basic structure of a sixth exemplary embodiment of the present invention.

In the forgoing exemplary embodiments, the present invention is applied to the refection type encoder. Further, the present invention may be applied to the transmission type encoder as shown in FIG. 9 as a sixth exemplary embodiment.

In the sixth exemplary embodiment, light emitted from a light source transmits through the first grating 22 and the second grating 20 successively, and generates interference fringes 40 on a light receiving surface of the light receiving array 31.

In any of the foregoing exemplary embodiments, the third grating and the light receiving element are integrated into the light receiving array, but they may be separately formed.

If not only the first grating but also a part of the third grating is shifted in the direction of the measurement axis as with the case of the first grating, the third grating can remove a harmonic component of the same order as or the different order from the first grating.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A three-grating type photoelectric encoder comprising:
a light source for outputting light;
a first grating, disposed to directly receive the outputted light from the light source;
a second grating disposed to reflect the outputted light after the outputted light passes through said first grating;
a third grating, disposed to receive the outputted light reflected from said second grating, and
a detector, wherein
the second grating is formed on a scale and the first and third gratings are disposed on a side of the detector, wherein
a part of at least the first grating is shifted in a direction of a measurement axis by $P/(2n)$ (wherein P is a grating pitch, n is the order of a harmonic component to be removed) in order to remove a harmonic component of the nth order.

2. The photoelectric encoder according to claim 1, wherein the first grating is divided in a direction perpendicular to the measurement axis or in the direction of the measurement axis, and shifted.

3. The photoelectric encoder according to claim 2, wherein the first grating is divided into at least three portions in the direction perpendicular to the measurement axis, and shift areas and non-shift areas are alternately arranged in the direction perpendicular to the measurement axis.

4. The photoelectric encoder according to claim 2, wherein a shift area of the first grating is divided into a plurality of portions every predetermined number of slits in the direction of the measurement axis, and the shift areas and non-shift areas are alternately arranged in the direction of the measurement axis.

5. The photoelectric encoder according to claim 2, wherein a plurality of portions of the first grating is shifted by respective different shift amounts.

6. The photoelectric encoder according to claim 5, wherein the shift amount is continuously varied to deform a grating pattern in the shape of a sine wave.

7. The photoelectric encoder according to claim 1, wherein a part of the third grating is also shifted in the direction of the measurement axis.

8. The photoelectric encoder according to claim 2, wherein a part of the third grating is also shifted in the direction of the measurement axis.

9. The photoelectric encoder according to claim 3, wherein a part of the third grating is also shifted in the direction of the measurement axis.

10. The photoelectric encoder according to claim 4, wherein a part of the third grating is also shifted in the direction of the measurement axis.

11. The photoelectric encoder according to claim 5, wherein a part of the third grating is also shifted in the direction of the measurement axis.

12. The photoelectric encoder according to claim 6, wherein a part of the third grating is also shifted in the direction of the measurement axis.

* * * * *